United States Patent [19]
Fujiwara et al.

[11] Patent Number: 4,760,419
[45] Date of Patent: Jul. 26, 1988

[54] DISTANCE MEASURING APPARATUS

[75] Inventors: Akihiro Fujiwara, Kanagawa; Takashi Amikura; Masamichi Toyama, both of Tokyo; Kouichi Ueda, Kanagawa; Susumu Kozuki, Tokyo, all of Japan

[73] Assignee: Canon Kabushiki Kaisha, Tokyo, Japan

[21] Appl. No.: 943,131

[22] Filed: Dec. 18, 1986

[30] Foreign Application Priority Data

| Dec. 26, 1985 | [JP] | Japan | 60-295159 |
| Dec. 26, 1985 | [JP] | Japan | 60-295160 |
| Dec. 26, 1985 | [JP] | Japan | 60-295161 |
| Dec. 26, 1985 | [JP] | Japan | 60-295162 |
| Jan. 18, 1986 | [JP] | Japan | 61-008680 |

[51] Int. Cl.⁴ ............................................. G03B 3/00
[52] U.S. Cl. .................................. 354/403; 352/140; 356/1
[58] Field of Search ..................... 354/403; 352/140; 356/1

[56] References Cited

U.S. PATENT DOCUMENTS

| 4,429,967 | 2/1984 | Tokuda et al. | 354/403 |
| 4,527,892 | 7/1985 | Yamane et al. | 354/403 |
| 4,542,971 | 9/1985 | Numata | 354/403 |
| 4,573,783 | 3/1986 | Maruyama | 354/403 |
| 4,621,917 | 11/1986 | Kaneda | 354/403 |
| 4,623,237 | 11/1986 | Kaneda et al. | 354/403 |
| 4,652,107 | 3/1987 | Tamura | 354/403 |

Primary Examiner—Russell E. Adams
Attorney, Agent, or Firm—Fitzpatrick, Cella, Harper & Scinto

[57] ABSTRACT

A distance measuring apparatus which emits light toward an object, receiving light reflected by the object, and measuring the distance of the object. This apparatus includes receiving means for receiving the reflected light, and the receiving means has at least two receiving areas. According to a disclosed technique, a mean value of photoelectric outputs from the respective receiving areas is calculated, and the distance of the object is measured on the basis of the difference between the mean value and the photoelectric output from either of the receiving areas. According to another disclosed technique, stabilization is provided with respect to amplifier means for amplifying the photoelectric outputs from the receiving means and integrating means.

5 Claims, 6 Drawing Sheets

SYNC

DISTANCE MEASURING APPARATUS

BACKGROUND OF THE INVENTION

1. Field of the Invention

The present invention relates generally to a distance measuring apparatus used with an image pickup system for various types of cameras, such as video cameras and still cameras. More specifically, the invention relates to an active type of automatic focus detecting device arranged to project spot light such as infrared rays onto an object, receiving reflected light by at least a pair of light receiving elements, and obtaining a signal representative of a detected state of focus.

2. Description of the Related Art

With reference to FIGS. 1 to 4(b), description will be made below of a typical form of construction of a so-called active type automatic focus adjustment system in which focus is adjusted on the basis of the difference between the outputs supplied from a pair of light receiving elements.

Figure 1:
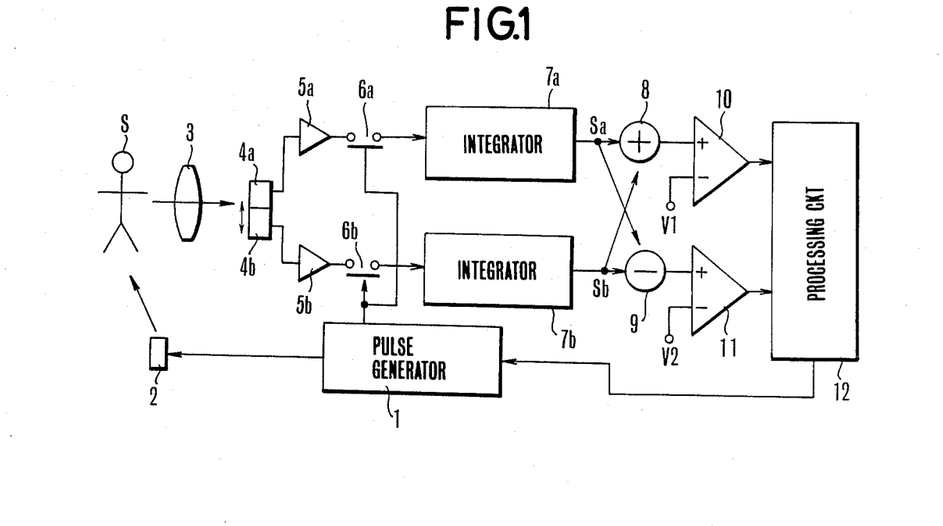
FIG. 1 is a circuit diagram of a conventional active type of distance measuring apparatus.

As shown in, for example, FIG. 1, when a light emitting element 2 is driven by a pulse generated by a pulse generator 1, the light emitting element 2 projects spot light onto an object S. The light reflected by the object S enters a pair of light receiving elements 4a and 4b through a converging lens 3. As an image pickup lens (not shown) is moved for focus adjustment, the light receiving elements 4a and 4b are capable of moving in the directions of a double headed arrow shown in FIG. 1. The outputs of the light receiving elements 4a and 4b are respectively delivered through amplifiers 5a and 5b to synchronizing detector circuits 6a and 6b which are synchronized with a pulse generator 1. The synchronizing detector circuits 6a and 6b remove unnecessary noise components such as external light from the inputs, and supply them to the following integrators 7a and 7b.

Figure 2A:
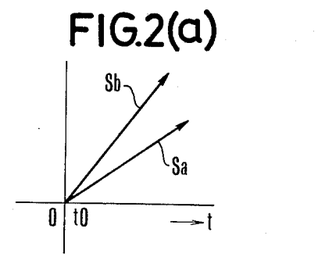
FIGS. 2(a), 2(b) and 2(c) are respectively graphs used as an aid in explaining the apparatus shown in FIG. 1.

As shown in FIG. 2(a), the levels of outputs Sa and Sb of the integrators 7a and 7b gradually increase with the passage of time t. As an example, when Sa<Sb in which the intensity of the spot light incident on the light receiving element 4b is far stronger than that of the spot light incident on the other element 4a, a camera (not shown) is out of focus. On the other hand, if the camera is in focus, difference is not substantially found between the levels of the outputs Sa and Sb, and thus Sa≈Sb is obtained. The outputs Sa and Sb of the integrators 7a and 7b are input to an adder 8 for further adding of these outputs Sa and Sb, and at the same time to a substracter 9 for finding the remainder between the absolute values of the outputs Sa and Sb. The outputs of the adder 8 and the subtracter 9 are respectively input to comparators 10 and 11 each having a set of predetermined threshold values V1 and V2 (V1>V2). The outputs of the comparators 10 and 11 are connected to a processing circuit 12.

Figure 2B:
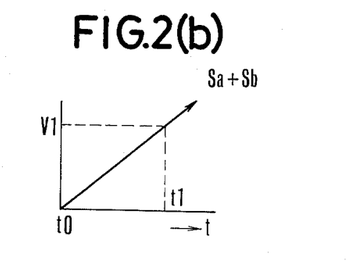

Referring to FIG. 2(b) showing the output of the adder 8, the level of an output Sa+Sb gradually increases with the passage of time t, and, at a time t1 at which a threshold value V1 is reached, the comparator 10 outputs an "H" level.

Figure 2C:
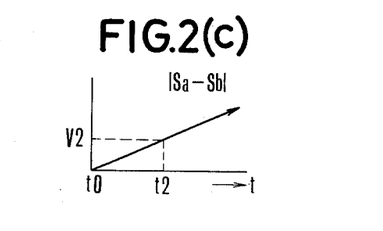

Referring to FIG. 2(c) showing the output of the subtracter 9, the level of an output |Sa−Sb| gradually increases with the passage of time t, and, at a time t2 at which a threshold value V2 is reached, the comparator 11 outputs the "H" level. The processing circuit 12 uses these "H" levels in order to determine which of the times t1 and t2 is input to the circuit 12 earlier or how much earlier either of them is input thereto.

For example, where the time t2 at which |Sa−Sb| =V2 is supplied earliar than the time t1, the relationship of Sa=Sb is not created, that is, the lens (not shown) is out of focus. Conversely, where the time t1 at which Sa+Sb=V1 is supplied earlier than the time at which |Sa−Sb| =V2, it can be judged that a state close to Sa≈Sb is created and the lens is close to the focused state.

U.S. Pat. No. 4,389,106 disloses a technique by which the integrated outputs Sa and Sb of two light receiving elements are individually compared with a predetermined level, and operations are performed on the thus-obtained results.

However, the above-described conventional active type of automatic focus detecting device involves the following disadvantages.

As an example, when the quantity of light reflected from an object is at a low level, if unexpected noise enters from a control circuit or other external factors, either or both of the outputs Sa and Sb is greatly varied due to the influence of the noise. Thus, the integrated output Sa, Sb or Sa−Sb containing errors such as noise unavoidably reaches a predetermined threshold value. At this time, unnecessary judgement is made as to whether or not the lens is in focus, thus leading to an unstable focusing operation.

The typical synchronizing detector circuits 6a, 6b and the integrator 7 shown in the circuit diagram of FIG. 1 will be described below with reference to the detailed circuit diagram shown in FIG. 3. A capacitor 13b cuts off dc components from the output of an amplifier 13a, and applies such output to an analog switch 13c. The analog switch 13c and an analog switch 13d are alternately opened and closed in response to a synchronizing signal SYNC. A reference voltage Vo is applied to an input of the analog switch 13d. When the input shown in FIG. 4(a) is input as the voltage Vo, the potential at one end of a resistor 13e shows the waveform shown in FIG. 4(b). The rate of the current flowing in the resistor 13e is porportional to the potential difference between the potential shown in FIG. 4(b) and the voltage Vo. However, this relationship is established when an ideal amplifier is used as an operational amplifier 13f. Actually, a certain level of offset voltage is produced between the positive and negative input terminals of the operational amplifier 13f. This offset voltage is normally added to the input of a Miller integrating circuit constituted by the resistor 13e, the operational amplifier 13f and a capacitor 13g, so that, even if the input of the Miller integrating circuit is "0", the result of integration unavoidably includes a potential difference other than "0". To solve the problem, a voltage which is biased by an amount equivalent to the discrepancy with respect to Vo is applied through a variable resistor 13h to the positive input terminal of the operational amplifier 13f, and thus a manual adjustment is made so that the integral result relative to a zero input reaches "0". However, since the offset amount is varied due to the influences of external factors such as temperature changes, this prior-art adjustment also entails the risk of making the accuracy of distance measurement unstable.

Incidentally, U.S. patent application Ser. No. 603,660 discloses related art to the present patent application.

SUMMARY OF THE INVENTION

Accordingly, it is a first object of the present invention to provide an automatic focus detecting device of a so-called active type which is capable of operating rapidly and stably irrespective of the occurrence of noise.

It is a second object of the present invention to provide an automatic focus detecting device in accordance with the first object which is capable of accurately detecting a focus even if a signal output form a light receiving means is weak.

To these ends, the present invention provides a device including a first means in which a mean value is obtained from the outputs from light receiving means having at least two light receiving areas, the difference between such means value and the integrated output of either of the areas being calculated, thereby performing a determination of the distance of an object.

The device of this invention further includes a second means arranged to stablize and adjust amplifier means for amplifying photoelectric outputs and integrating means for integrating the output amplified by such amplifier means before these means are actually actuated to make a distance measurement.

In particular, the integrating means includes means capable of automatically adjusting an offset voltage so that a zero input is converted into a zero output. In addition, the amplifier means is arranged in such a manner that its gain can be varied on the basis of the preceding photoelectric output in order to ensure a sufficient dynamic range and to obtain a suitable integral quantity.

The above and other objects and features of the invention will become apparent from the following detailed description of embodiments thereof taken in connection with the accompanying drawings.

DETAILED DESCRIPTION OF THE PREFERRED EMBODIMENT

A preferred embodiment of the present invention will be described below with reference to the accompanying drawings.

Figure 5:
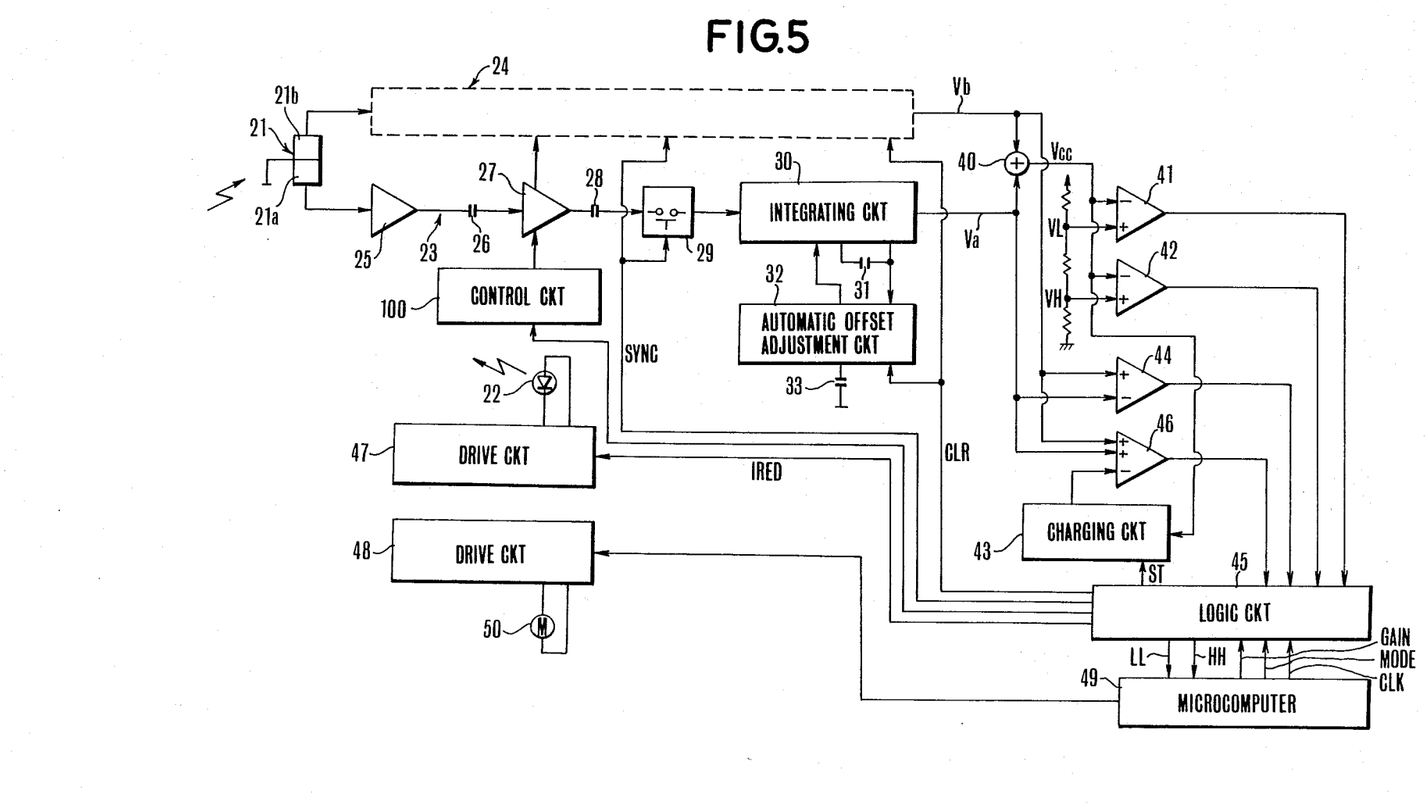
FIG. 5 is a diagram of a circuit in accordance with the present invention.

Referring to FIG. 5, a photodetector 21 has a two-piece structure constituted by light receiving elements 21a and 21b, and has a sensitivity necessary for sensing the wavelength emitted by an infrared-emitting diode 22. The photoelectric currents obtained by the light receiving elements 21a and 21b are respectively introduced into first and second signal processing circuits 23 and 24. Since the circuits 23 and 24 are completely the same, solely the first signal processing circuit 23 is shown in FIG. 1, but the second circuit 24 is shown by a dotted line in the same Figure. The output of the light receiving element 21a is delivered to a sensor amplifier 25 in which the photoelectric current of the element 21a is converted into a voltage. Since the sensor amplifier 25 is easily affected by noise, it is preferable that it is disposed closest to the photodetector 21. The light input to the photodetector 21 contains a certain percentage of unwanted external light components in addition to a desired infrared signal component. Therefore, in order to prevent the unwanted components from saturating the output of the sensor amplifier 25, a suitable means for coping with this is preferably adopted in accordance with necessity, such as the addition of high-pass characteristics or the provision of a circuit for eliminating photoelectric currents including external-light components. A capacitor 26 cuts off dc components from the voltage output of the sensor amplifier 25, and supplies such output to a preamplifier 27. As described later, the preamplifier 27 is arranged to select the level of gain from three options such as onefold, eightfold and sixty-four fold. This arrangement ensures a sufficient dynamic range with respect to an input signal and a suitable integrated signal. A capacitor 28 further cuts off dc components from the output of the preamplifier 27, and supplies the output to a synchronizing detector circuit 29. This synchronizing detector circuit 29 is supplied with a pulse signal SYNC which is synchronized with the emission pulse of the light emitting diode 22, delivering a signal representing the difference between the respective potentials provided by the states of nonemission and emission to the following integrating circuit 30. The integrating circuit 30 integrates the thus-obtained detection output voltage, and accumulates it in a capacitor 31. The output of an automatic offset adjustment circuit 32 is connected to the integrating circuit 30, and the input offset voltage of a differential amplifier used in the integrating circuit 30 is stored in a capacitor 33, so that the integrating circuit 33 functions to produce a zero integral output in correspondence with a zero input. Incidentally, since the above description is applied to the second signal processing circuit 24 as well, the description is omitted for the sake of simplicity.

The two integrating circuits 30 of the first and second signal processing circuits 23 and 24 respectively deliver outputs Va and Vb to an adder 40 which functions to calculate a mean value (Va+Vb)/2 of the outputs Va and Vb. The mean value (Va+Vb)/2 is applied to the negative input terminal of each comparator 41 and 42 as well as to a charging circuit 43. On the other hand, constant voltages VL and VH are applied to the positive input terminal of each of the comparators 41 and 42, such voltages VL and VH being threshold voltages used to judge whether or not integration is completed. The comparator 44 is supplied with the integral outputs Va and Vb at the negative and positive input terminals, respectively, and compares the levels of the outputs Va and Vb. Such comparator 44 produces output representative of the directionality of a motor 50 for driving an image pickup lens (not shown). The charging circuit 43 is supplied with a step signal ST from a logic circuit 45 in addition to the mean value (Va+Vb)/2. The circuit 43 functions to add a voltage to the voltage input (Va+Vb)/2 in a stepped manner in response to the step signal ST, and applies the thus-obtained voltage to the negative input terminal of a comparator 46. In addition, the comparator 46 has two negative input terminals supplied with the integral outputs Va and Vb. This comparator 46 is capable of comparing the output Va or Vb with (Va+Vb)/2—stepped voltage, and this enables measurement of the integral outputs Va and Vb at a predetermined time on the basis of the number of steps and the timing of inversion of the comparator 46.

The logic circuit 45 receives signal inputs from the comparators 41, 42, 44 and 46, and supplies signals to the charging circuit 43, the integrating circuit 30, the synchronizing detector circuit 29, an infrared drive circuit 47 for projecting light onto an object, and a motor driving circuit 48. The circuit 45 is also connected to a microcomputer 49 via at least five input-/output lines for digital signals. The infrared drive circuit 47 is arranged to drive a light emitting diode 22, and the motor driving circuit 48 is arranged to drive the motor 50 for causing the movement of the camera lens (not shown).

Where the above-described automatic focus detecting device is, for example, incorporated into a video camera, since the distance between the camera and an object continues to change, it is necessary to continuously keep the lens in focus by continuously detecting the momentary state of focus. As described later, in order to stabilies the respective circuits, such focus detection is performed by sequentially repeating four modes: IDLE, INTEG, HOLD and CLEAR.

The microcomputer 49 supplies a clock pulse signal CLK, a mode signal MODE and a gain signal GAIN to the logic circuit 45. The circuit 45 generates signals IRED, CLR and a gain selection signal by combining the aforementioned signals. The signal CLK is used to generate the infrared drive signal IRED, the synchronizing signal SYNC, and the step signal ST supplied to the charging circuit 43. The mode signal MODE sequentially assumes the above-mentioned four modes, IDEL, INTEG, HOLD and CLEAR during one distance measuring operation. The signal GAIN is used to select the gain level of the preamplifier 27. Specifically, when the signal processing circuits 23 and 24 are reset, the maximum level of gain is set, and, each time the pulse signal GAIN is supplied, the gain level of the preamplifier 27 is lowered step by step. Flip-flops FLL and FHH in the logic circuit 45 are respectively connected to the microcomputer 49 via signal lines LL and HH.

Figure 6:
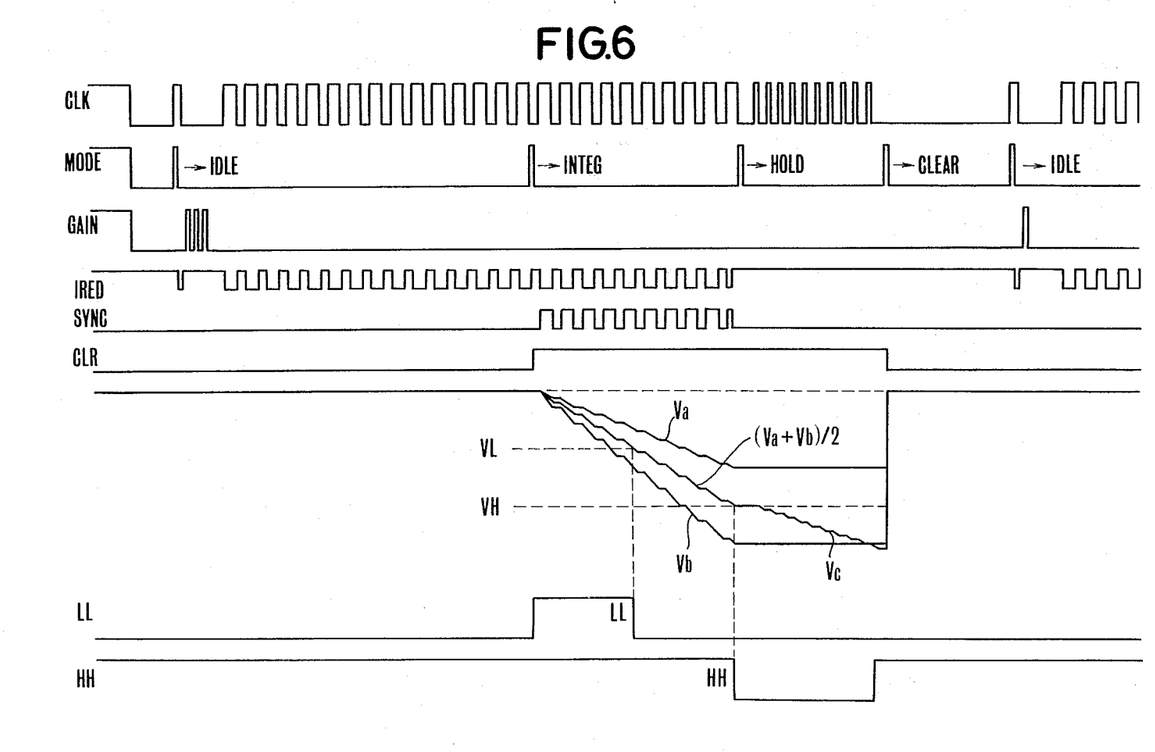
FIG. 6 is a waveform chart used as an aid in explaining the operation of the circuit shown in FIG. 5.

FIG. 6 is a chart of the control signals used in the circuit arrangement shown in FIG. 5. As can be seen from FIG. 6, when each of the signals CLK and MODE goes to an "H" level, the signal processing circuits 23 and 24 are reset and the IDLE mode is selected. In the IDLE mode, neither the synchronizing detector circuit 29 nor the integrating circuit 30 produces any output. The infrared drive circuit 47 is actuated in response to the signal IRED which is synchronized with the pulse timing of the signal CLK. While the IDLE mode is continued during a required period, the automatic offset adjustment circuit 32 of the integrating circuit 30 performs an automatic offset adjustment and the stabilization of an infrared output.

Figure 3:
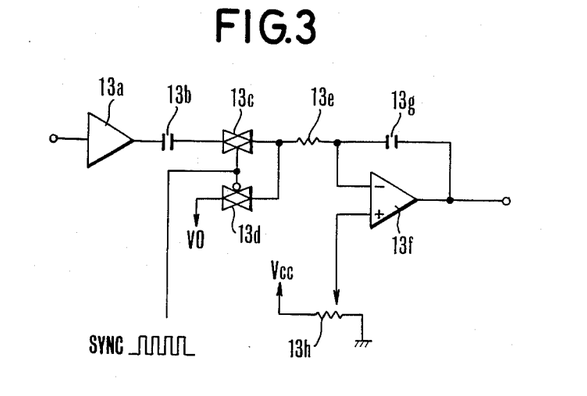
FIG. 3 is a circuit diagram used as an aid in particularly explaining an integrating circuit 7 shown in FIG. 1.
Figure 4A:
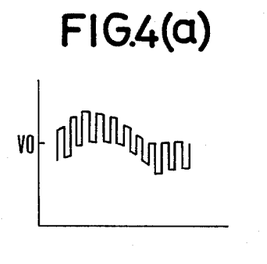
FIGS. 4(a) and 4(b) are respectively graphs used as an aid in explaining the operation of the integrating circuit 7 shown in FIG. 3.
Figure 4B:
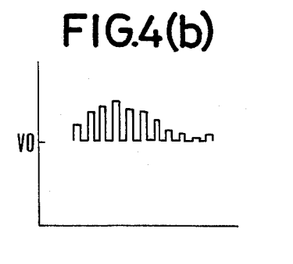

The prior-art device incorporating the synchronizing detector circuit 6 and the integrator 7 shown in FIG. 3 output noise components including external light without cutting them off, and thus an adjustment element is needed to eliminate offset. In the presently preferred embodiment, however, a zero input can be converted into a zero output by virtue of the circuit arrangement shown in FIG. 7, which is constituted by the synchronizing detector circuit 29, the integrating circuit 30, and the automatic offset adjustment circuit 32.

Figure 7:
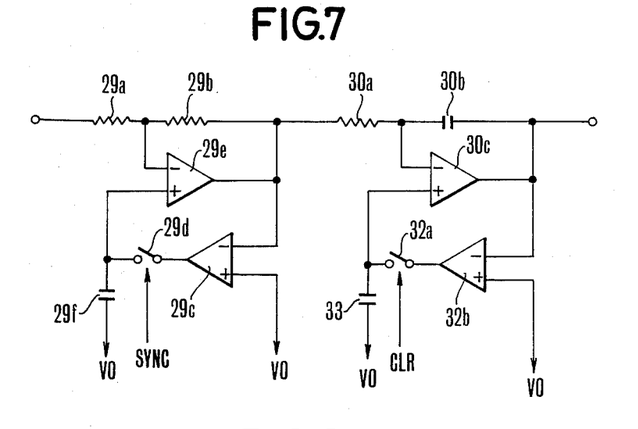
FIG. 7 is a circuit diagram of means for adjusting integrating means in accordance with the present invention.

Referring to FIG. 7, the synchronizing detector circuit 29 includes elements 29a, 29b, 29c, 29d, 29e, and 29f. The resistors 29a and 29b can be regarded as a onefold inverted amplifier. When the signal SYNC goes to an "L" level, the switch 29d is closed and the output of the operational amplifier 29c having transconductance is applied to the positive input terminal of the differential amplifier 29e. When the signal SYNC goes to an "H" level, the switch 29d is opened, that is, the negative input terminal of the differential amplifier 29e has a high impedance. When the signal IRED indicates the state of non-emission, the signal SYNC goes to the "L" level, the output of the differential amplifier 29e reaching the reference voltage Vo, and the potential of the capacitor 29f reaches an intermediate value between the current input voltage and Vo. On the other hand, when the signal IRED indicates the state of emission, the signal SYNC goes to the "H" level, and the output of the operational amplifier 29c is cut off by the switch 29d. Thus, the output of the differential amplifier 29e is equivalent to an inverted value of its current voltage input, such inverted value being obtained with reference to the hold voltage of the capacitor 29f. In consequence, the differential amplifier 29e outputs the sole signal synchronized with the signal SYNC, in proportion to the amplitude thereof.

The integrating circuit 30 includes elements 30a, 30b and 30c. The resistor 30a, the capacitor 30b and the differential amplifier 30c constitute a general Miller integrating circuit capable of producing a high output by using the amplification of the differential amplifier 30c. Incidentally, the capacitor 30b is equivalent to the capacitor 31 shown in FIG. 5.

A switch 32a and an operational amplifier 32b constitute an automatic offset adjustment circuit. The switch 32a is closed in response to the signal CLR which goes to the "H" level solely in the INTEG and HOLD modes, and the output of the operational amplifier 32b having transconductance is applied to the positive input terminal of the differential amplifier 30c. When the signal CLR goes to the "L" level, the switch 32a is opened and the positive input terminal of the differential amplifier 30c has a high impedance. When the signal CLR changes to the "H" level in the IDLE mode, that is, during a predetermined period just before the commencement of integration, the output of the differential amplifier 30c reaches the reference voltage Vo and the capacitor 33 accumulates the offset voltage of the differential amplifier 30c. When the signal CLR goes to the "L" level, the output of the operational amplifier 32b is cut off by the switch 32a and the integrating circuit 30 functions as a general Miller integrating circuit. Since the offset voltage is held in the capacitor 33, the offset voltage of the differential amplifier 30c is cancelled, so that a zero input can be integrated into a zero output.

Subsequently, when a pulse of the signal MODE is supplied, the process proceeds to the INTEG mode. In the INTEG mode, the integrating circuit 30 starts integration from zero, and the sychronizing detector circuit 29 detects and synchronizes the photoelectric signal of the light receiving element 21a in response to the signal SYNC synchronized with the infrared drive signal IRED. The integrating circuit 30 performs integration when receiving an input from the synchronizing detector circuit 29 synchronized with the signal SYNC, and the integral outputs Va and Vb are decreased at a rate proportional to the strength of such signal input.

The comparators 41 and 42 respectively compare the threshold values VL and VH with the mean value $(Va+Vb)/2$ of the integral outputs of the first and second signal processing circuits 23 and 24, such means value being the output of the adder 40. When the value $(Va+Vb)/2$ reaches the threshold values VL and VH, the following change occurs. More specifically, flip-flops FLL and FHH (not shown) in the logic circuit 45 are reset to the "H" level, and, when the value $(Va+Vb)/2$ crosses the threshold values VL and VH, the filp-flops FLL and FHH are set to the "L" level with respect to the comparators 41 and 42. The output of the flip-flop FHH normally appears on an output line HH, while that of the flip-flop FLL appears on an output line LL in the INTEG mode only. By referring to the digital signals supplied from the flip-flops FLL and FHH, the microcomputer 49 is capable of checking an integral quantity on the basis of the threshold values VL and VH. The threshold value VH is used to determine the completion of an integrating operation, that is, the INTEG mode. It should be noted that, even if a sufficient intensity of light is not reflected from an object and the value $(Va+Vb)/2$ does not reach the threshold value VH, the logic circuit 45 and the microcomputer 49 function to force the flip-flop FHH to proceed to the following HOLD mode after the predetermined passage of time and to be automatically changed to the "L" level.

Subsequently, the HOLD mode is selected in response to a pulse of the signal MODE supplied from the microcomputer 49. In the HOLD mode, the integrating circuit 30 continues its integration-enable state, while the synchronzing detector circuit 29 and the infrared driving circuit 47 assume the non-operative state. During this time, the integral outputs Va and Vb of the signal processing circuits 23 and 24 are held at their voltage value, and detection is made with respect to the difference between either of the outputs Va and Vb and the mean value $(Va+Vb)/2$. Thus, in the HOLD mode, the frequency of the signal CLK is varied and this contributes to the generation of the step signal ST. In the preceding INTEG mode, the output of the adder 40 is output without variation and thus the output of the charging circuit 43 is equal to the mean value $(Va+Vb)/2$ of the integral outputs Va and Vb. However, in the HOLD mode, the charging circuit 43 is charged in response to the step signal ST having a fixed cycle and a certain level of electric energy, which signal is itself output in accordance with the signal CLK. Thus the output of the charging circuit 43 drops at a fixed rate as shown by a signal Vc. Subsequently, when such output crosses the lower voltage of the integral outputs Va and Vb, the flip-flop FHH is reset to the "H" level. Since this change is output to the output line HH, the microcomputer 49 measures a period during which the flip-flop FHH is in the "L-level" state, thereby judging the state of focus. In other words, it is possible to detect the potential difference between the integral outputs Va and Vb, and, as the potential difference becomes smaller, the lens gets closer to the state of being in focus. The microcomputer 49 performs operations on the basis of the outputs of the flip-flops FLL and FHH. Incidentally, if the positive and negative signs are substitued for each other, the aforementioned charging of the charging circuit 43 can be regarded as discharging of the same.

Figure 8:
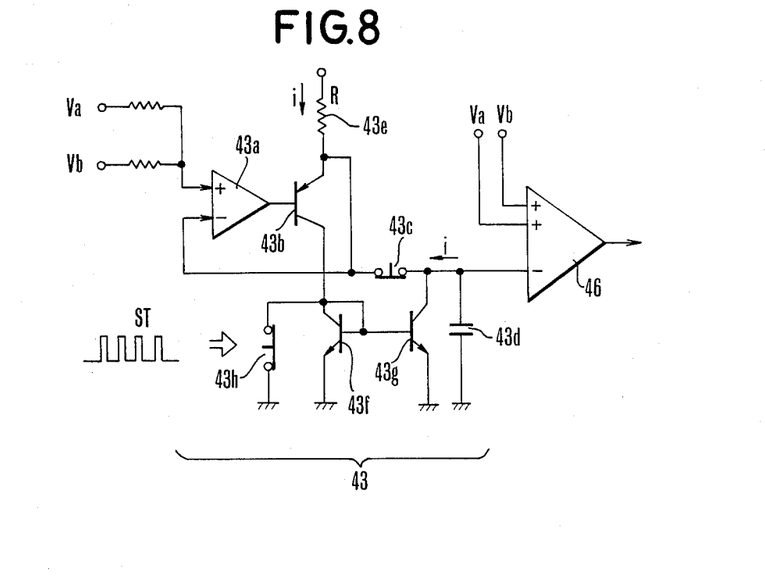
FIG. 8 is a circuit diagram of the essential portion of an automatic focus detecting device in accordance with the present invention.

The charging circuit 43 is arranged as shown in FIG. 8 by considering the case where the mean value $(Va+Vb)/2$ does not reach the threshold value VH within a predetermined period in the INTEG mode, that is, the integral outputs are small. FIG. 8 is a circuit diagram of the charging circuit 43 and the comparator 46. The emitter follower of an operational amplifier 43a and a transistor 43b consitutes a voltage follower and a voltage equal to the value $(Va+Vb)/2$ is developed at the emitter of the transistor 43b. This voltage is latched in a capacitor 43d via an analog switch 43c.

When integration is completed and the process proceeds to the HOLD mode, the analog switch 43c is opened and the capacitor 43d is separated from the voltage follower in a state wherein it holds the value $(Va+Vb)/2$ obtained when such integration is completed. Since the value $(Va+Vb)/2$ is provided at the emitter of the transistor 43b, if the resistance value of a resistor 43e is indicated by R, an electric current i is allowed to flow through the resistor 43e in proportion to the value $\{V0-(Va+Vb)/2\}/R$, namely, an integral quantity, where V0 is the integral quantity upon the commencement of integration. When HFF of the transistor 43d is sufficiently large, the current i flows through the collector of the transistor 43b into a current mirror constituted by transistors 43f and 43g. While a switch 43h is being closed, the current i flows to ground through the switch 43h. When the switch 43h is opened in response to the step signal ST, the current i flows into the current mirror and the same quantity of current is drawn out of a capacitor 43d. Therefore, the voltage of the capacitor 43d drops from the value $(Va+Vb)/2$ at a rate proportional to the integral quantity.

In accordance with the above-described circuit arrangement, where the value of the integral voltage $(Va+Vb)/2$ reaches the threshold value VH, the drawn current reaches a level $(V0-VH)/R$; whereas, where the same reaches the threshold value VL, the drawn current reaches a level $(V0-VL)/R$. Specifically, since the drawn current changes in proportion to the integral quantity in both cases, even if the quantity of incident light is small and the integral voltage does not reach the threshold value VH, it is possible to consistently estimate a discrepancy ratio and this provides a fixed estimation reference. Accordingly, even when a low-level signal is only obtained since reflectivity is low or an object is remote, it is possible to perform a focusing operation with precision substantially equal to that of a normal distance measurement.

Therefore, the process proceeds to the CLEAR mode in response to a pulse of the signal MODE. In the CLEAR mode, similar to in the IDLE mode, neither the synchronizing detector circuit 29 nor the integrating circuit 30 produces any output and they are initialized, so that infrared-rays are not driven. The relationship between the levels of the integral outputs Va and Vb is latched until the process returns to the HOLD mode, the motor 50 being driven by the motor driving circuit 48, and the lens thus being moved in the direction of attaining focus. Incidentally, this focusing direction is determined in accordance with whether the comparator 44 produces a positive or negative output.

As described above, the automatic focus detecting device in accordance with the present invention judges the state of focus solely when the device stably operates irrespective of the occurrence of noise. In addition, in the non-focused state, it is possible to determine the direction of attaining focus or the amount of discrepancy with respect to focus. Particularly even when incident light is weak, a satisfactory accuracy of distance measurement can be ensured.

Figure 9A:
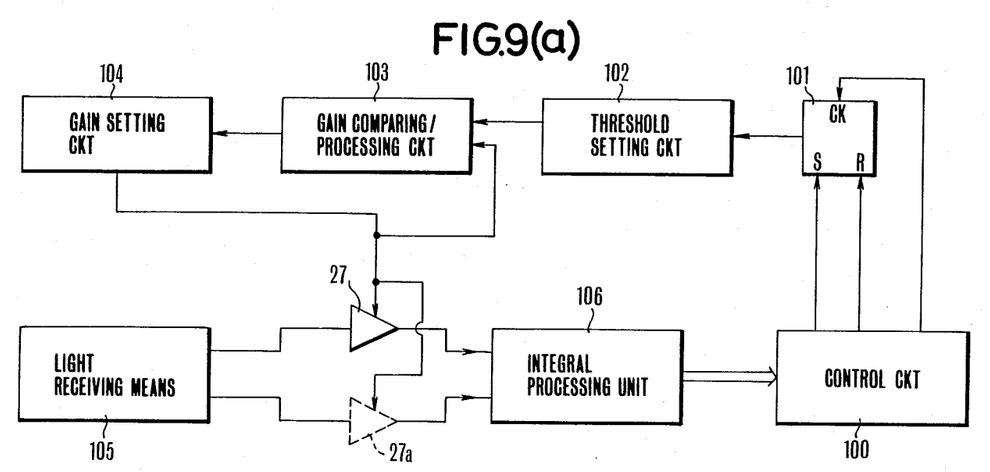
FIG. 9(a) is a block diagram of means for setting the gain of an amplifier means in accordance with the present invention.

The selection of the gain level of the preamplifier 27 will be described below with reference to FIG. 9(a) showing the preamplifier 27 and its associated constituent elements. A control circuit 100 controls the logic circuit 45 and the microcomputer 49 shown in FIG. 5. A light receiving means 105 includes the light receiving elements 21 and the amplifier 25. The preamplifier 27 is also shown in FIG. 5, and an integral processing unit 106 includes elements, such as the synchronizing detector circuit 29, the integrating circuit 30 and a comparator. A counter 101 has a set terminal S and a reset terminal R, the set terminal S being supplied by the control circuit 100 with a signal representative of the INTEG mode, namely, a signal indicative of the commencement of integration while the reset terminal R being supplied by the control circuit 100 with a signal representative of the completion of integration, for example, an output obained when the mean value (Va+Vb)/2 of photoelectric outputs reaches the threshold value VH. In brief, the counter 101 counts the time taken to perform integration. The output of the counter 101 is supplied through a threshold setting circuit 102 to a gain comparing/processing circuit 103. The output of the circuit 103 is connected to the preamplifiers 27 and 27a through a gain setting circuit 104.

Figure 9B:
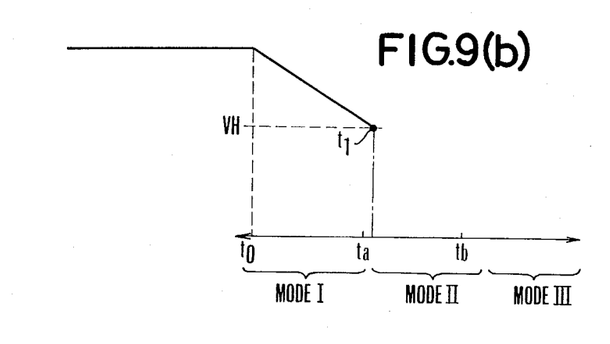
FIG. 9(b) is a chart used as an aid in explaining the operation of the gain setting means shown in FIG. 9(a).

The operation of the circuit construction shown in FIG. 9(a) will be described below with reference to FIG. 9(b). The counter 101 starts to measure integration time symultaneously with the commencement of integration. When a mean output (Sa+Sb)/2 of integral values exceeds, for example, a predetermined threshold value VH, that is, at a time ti, the control circuit 100 outputs an "H" level signal, and the counter 101 stops counting in response to such signal. The counter 101 measures the time t1 and the threshold setting circuit 102 compares the time t1 with time passing until the following predetermined timings ta and tb (ta<tb) are reached. The threshold circuit 102 selects a mode I when the time tI reaches an intermediate point between the times t0 and ta, a mode II when the time tI reaches an intermediate point between the times ta and tb, and a mode III when the time tI passes the time tb. The output of the threshold setting circuit 102 is delivered to the gain comparing/processing circuit 103, and thus the amplifiers 27 and 27a are adjusted. Table 1 shows the classes of operation of the gain comparing/processing circuit 103.

TABLE

| Preceding gain | Mode I | Mode II | Mode III |
| --- | --- | --- | --- |
| 1× | unchanged | Unchanged | Up to 8× |
| 8× | Down to 1× | Unchanged | Up to 64× |
| 64× | Down to 8× | Unchanged | Unchanged |

In the above table, when the time t1 corresponds to the mode I, the onefold gain is not changed, if the preceding level of gain is onefold. If the preceding lavel of gain is eightfold, it is stepped down to onefold. If the preceding level of gain is sixty-fourfold, it is stepped down to eightfold. In the mode II, the preceding gain level is unchangedly used. In the mode III, if the preceding gain level is onefold, it is stepped up to eightfold. If this gain level is eightfold, it is stepped up to sixty-fourfold. If the gain level is sixty-fourfold. it is not changed.

As will be evident from the foregoing, in accordance with the present invention, if a long integration time is taken until the mean integral output (Sa+Sb)/2 reaches the threshold value VH, the levels of the signal outputs of the light receiving elements 21a and 21b are low and S/N ratio is high. In this case, if each of the amplifiers 27 and 27a has a gain including a margin, control is performed so that the gain level is increased. On the other hand, if integration time is short until the mean integral output (Sa+Sb)/2 reaches the threshold value VH, the levels of the signal outputs of the light receiving elements 21a and 21b are sufficiently high. In this case, if the amplifiers 27a and 27b corresponding to the light receiving elements 21a and 21b are used in a high-gain state, the gain level is stepped downward.

As described above, the automatic focus detecting device in accordance with the present invention is capable of obtaining a signal level suitable for integration, by changing the gain level of the amplifiers in accordance with the output level of the light receiving element, whereby judgement can be stably made as to the state of focus without substantial malfunction as might be caused by noise.

What is claimed is:

1. A distance measuring apparatus arranged to emit light toward an object and measure the distance of said object on the basis of light reflected by said object, comprising:
   (a) receiving means having at least two receiving areas for receiving said reflected light;
   (b) first processing means for calculating a mean value of the outputs from said receiving areas of said receiving means;
   (c) difference detecting means for detecting the output difference between said mean value obtained by said first processing means and the output of either of said receiving areas; and
   (d) second processing means for performing operations on information relative to the distance to said object on the basis of a signal detected by said difference detecting means.

2. A distance measuring apparatus according to claim 1, wherein said difference detecting means is arranged to detect the difference between the output of either of said receiving areas and the output of said mean value when said output of said mean value reaches a predetermined level.

3. A distance measuring apparatus according to claim 2, wherein said difference detecting means detects time that elapses from the completion of integration of said light to a time at which said output of said mean value reaches an integral output of either of said receiving areas through charging and discharging.

4. An apparatus comprising:
   (a) emitting means for emitting light;
   (b) receiving means for receiving the light reflected from an object;
   (c) amplifier means for amplifying the photoelectric output of said receiving means, wherein the gain of said amplifier means is varied in a plurality of steps;

(d) processing means for performing operations on the distance relative to said object on the basis of the output of said amplifier means, thus generating information representative of distance measurement; and
(e) gain control means for controlling the gain of said amplifier means from the gain set during a first distance measuring operation on the basis of the output of said amplifier means to perform a second distance measurement operation following the first distance measurement operation of said processing means.

5. An apparatus according to claim 4 further includes control means for actuating said processing means after completion of setting of said gain of said amplifier means.

* * * * *

UNITED STATES PATENT AND TRADEMARK OFFICE
CERTIFICATE OF CORRECTION

PATENT NO. : 4,760,419
DATED : July 26, 1988
INVENTOR(S) : AKIHIRO FUJIWARA, ET AL.    Page 1 of 2

It is certified that error appears in the above-identified patent and that said Letters Patent is hereby corrected as shown below:

COLUMN 1

Line 49, "substracter" should read --subtracter--.

COLUMN 2

Line 4, "earliar" should read --earlier--.
    Line 11, "disloses" should read --discloses--.
    Line 43, "porportional" should read --proportional--.

COLUMN 3

Line 10, "form" should read --from--.

COLUMN 4

Line 31, "four fold." should read --fourfold.--.
    Line 48, "integrating circuit 33" should read --integrating circuit 30--.

COLUMN 5

Line 33, "stabilies" should read --stabilize--.
    Line 45, "IDEL," should read --IDLE,--.

COLUMN 7

Line 20, "filp-flops" should read --flip-flops--.

UNITED STATES PATENT AND TRADEMARK OFFICE
CERTIFICATE OF CORRECTION

PATENT NO. : 4,760,419

DATED : July 26, 1988

INVENTOR(S) : AKIHIRO FUJIWARA, ET AL.    Page 2 of 2

It is certified that error appears in the above-identified patent and that said Letters Patent is hereby corrected as shown below:

COLUMN 8

Line 4, "substitued" should read --substituted--.

COLUMN 9

Line 39, "symultaneously" should read --simultaneously--.

COLUMN 10

Line 6, "sixty-fourfold." should read --sixty-fourfold,--.

Signed and Sealed this

Twelfth Day of December, 1989

Attest:

JEFFREY M. SAMUELS

Attesting Officer    Acting Commissioner of Patents and Trademarks